United States Patent [19]

Palmatier

[11] 4,384,568
[45] May 24, 1983

[54] SOLAR HEATING SYSTEM

[76] Inventor: Everett P. Palmatier, 1011 Seagate Dr., Delray Beach, Fla. 33444

[21] Appl. No.: 205,924

[22] Filed: Nov. 12, 1980

[51] Int. Cl.³ .............................................. F24J 3/02
[52] U.S. Cl. .................................... 126/422; 126/437; 126/419
[58] Field of Search ............... 126/435, 437, 432, 422, 126/450, 417, 419

[56] References Cited

U.S. PATENT DOCUMENTS

| | | | |
|---|---|---|---|
| 4,209,007 | 6/1980 | Collins | 126/437 |
| 4,210,125 | 7/1980 | Fender | 126/437 |
| 4,228,785 | 10/1980 | Wagenseller | 126/437 |
| 4,248,294 | 2/1981 | Budzynski et al. | 126/437 |
| 4,314,545 | 2/1982 | Bowman | 126/437 |

Primary Examiner—James C. Yeung
Attorney, Agent, or Firm—Malin & Haley

[57] ABSTRACT

A solar heating system comprising a solar collector having its input connected to a pressurized fluid source and its output connected to an input of a fluid storage device, the fluid flow from the output being controlled by a thermally controlled valve, a pressure release valve having one input connected to an input/output near the bottom of the fluid storage device, a second input connected to the pressurized fluid source and an output for discharging the excess fluid, and a pressure reducing valve connected between the pressurized fluid source and another input to the fluid storage device. When the pressure in the storage device increases to a predetermined level the pressure release valve will open and allow the excess fluid to be discharged therefrom. The pressure reducing valve enables the fluid storage device to be replenished if the pressure therein decreases to a level below the pressure of the fluid source. Thus, as the heated fluid flows from the output of the collector to the fluid storage device, the increased pressure in the fluid storage device is relieved by releasing the cooler fluid near the lower portion of the storage device. By constant monitoring of the pressures differential by the valves the fluid is allowed to circulate through the system without the necessity of circulating pumps or the use of a thermosyphon, even when the collector is elevated gravitationally above the storage tank.

5 Claims, 4 Drawing Figures

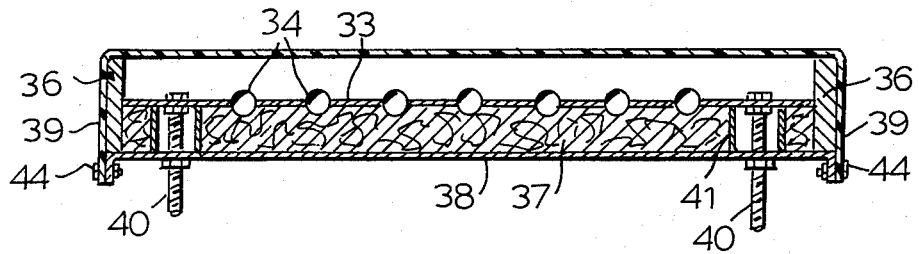
FIG.2
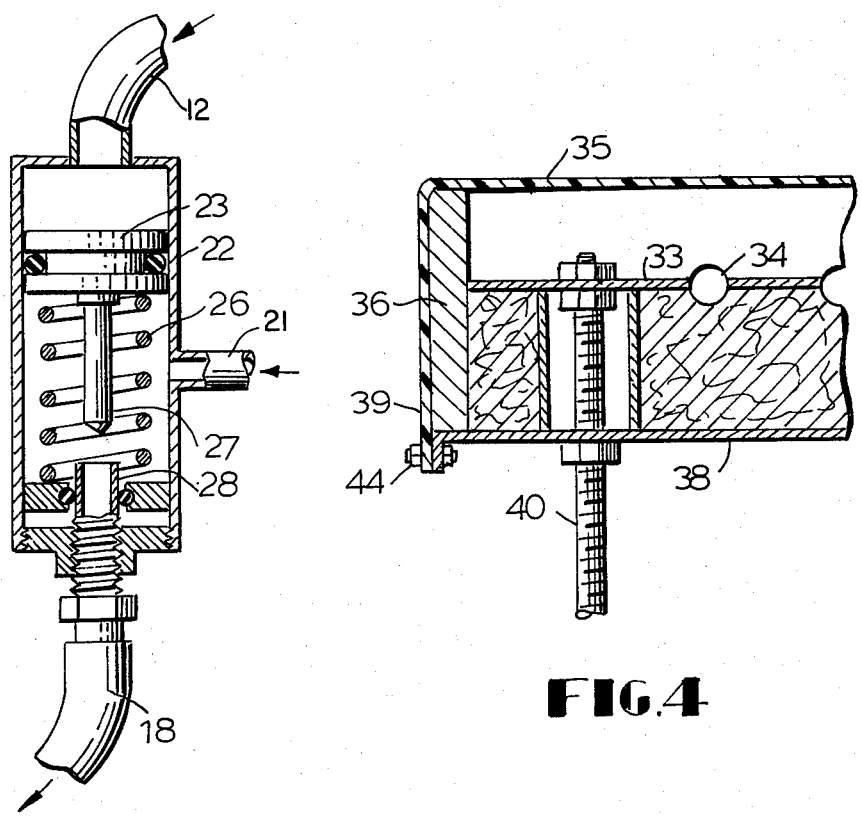
FIG.4
FIG.3

SOLAR HEATING SYSTEM

BACKGROUND OF THE INVENTION

This invention relates to solar fluid heating systems and more particularly to a solar fluid heating system which utilizes a series of valves controlled by temperature and pressure differentials to circulate the fluid through the system.

In the past, there have been various systems designed utilizing solar energy to heat different fluids. However, the majority of the systems, especially the ones having solar collectors elevated gravitationally above the heated fluid storage devices require the use of pumps to circulate the fluids through the system.

The present invention negates the necessity of a circulating pump by using a system of fluid pressure control and temperature control valves to effect the circulation of the fluid through the system. Thus the system requires no pump and no motor and no extra electrical energy is expended.

The prior art also includes thermosyphoned solar water heating systems which although they do not require circulation pumps, do require that the storage tank be at a higher elevation than the solar collector, which, is not necessary with the present invention.

Another advantage of the present invention is that the heated fluid passes through the solar collector only once, always entering the collector at the cold supply temperature and leaving at the desired hotter temperature. This results in a lower average collector temperature and less energy loss through insulation and transparent collector covers. The result is higher collector efficiency.

Also since the fluid passes through the collector only once, small flow rates in the order of only 0.01 gallons per minute per square foot of collector plate area are realized. This enables the majority of all lines, valves and fittings to be either a quarter inch or three-eights inch which is a nominal size for a system designed to operate in conjunction with conventional hot water heaters. This results in significant cost savings in piping, fittings, valves and insulation.

SUMMARY OF THE INVENTION

According to the present invention, a new and improved solar heating system is presented. The solar liquid heating system comprises a solar collector, a thermally controlled valve connected to the output of the solar collector, a liquid storage device, a pressure reducing valve and a pressure release device. In the preferred embodiment the solar heating system is used in combination with a conventional water service line and a conventional hot water heater to cut energy costs in the home environment.

The solar collector has its input connected to the water service line and its output connected to an input located in the top of the hot water heater. A thermally controlled valve is serially connected between the output of the solar collector and the input in the top of the water heater. Therefore once the water is heated to the desired temperature, the thermally controlled valve opens and enables the heated water to flow into the hot water heater. The pressure reducing valve is serially connected between the water service line and the normal input line of the water heater and is designed to enable water to enter the water heater from the water service line whenever the pressure in the water tank drops below a predetermined value. The pressure release valve has one input connected to an input/output aperture near the bottom of the water heater, a second input connected to the water service line, and a water discharge output. Whenever the pressure in the water heater increases to a predetermined value, the release valve opens and allows the excess water to be discharged from its water discharge output.

An accumulator can also be connected to the input/output water heater aperture so that when the water pressure increases in the water heater, the excess water will be collected therein and used to replenish the supply in the water heater whenever the pressure decreases.

It is therefore an object of this invention to provide a solar fluid heating system which provides circulation of fluid through the system without using thermosyphon principles or circulation pumps, with the collector elevated above the storage tank.

It is another object of this invention to provide a solar water heating system easily adaptable to be used in combination with a conventional water service line and a conventional water heater.

It is yet another object of this invention to provide a solar fluid heating system which provides a substantial savings in energy and equipment costs to the user of the system.

In accordance with these and other objects which will be apparent hereinafter, the instant invention will now be described with particular reference to the accompanying drawings.

BRIEF DESCRIPTION OF THE DRAWINGS

FIG. 2 is a cross-sectional view of the solar collector of FIG. 1 taken across the lines A—A and looking in the direction of the arrows.

FIG. 3 is a cross-sectional view of the pressure relief valve of FIG. 1.

FIG. 4 is a fragmentary, cross-sectional view of the solar collector connector of FIG. 2.

DESCRIPTION OF THE PREFERRED EMBODIMENT

Figure 1:
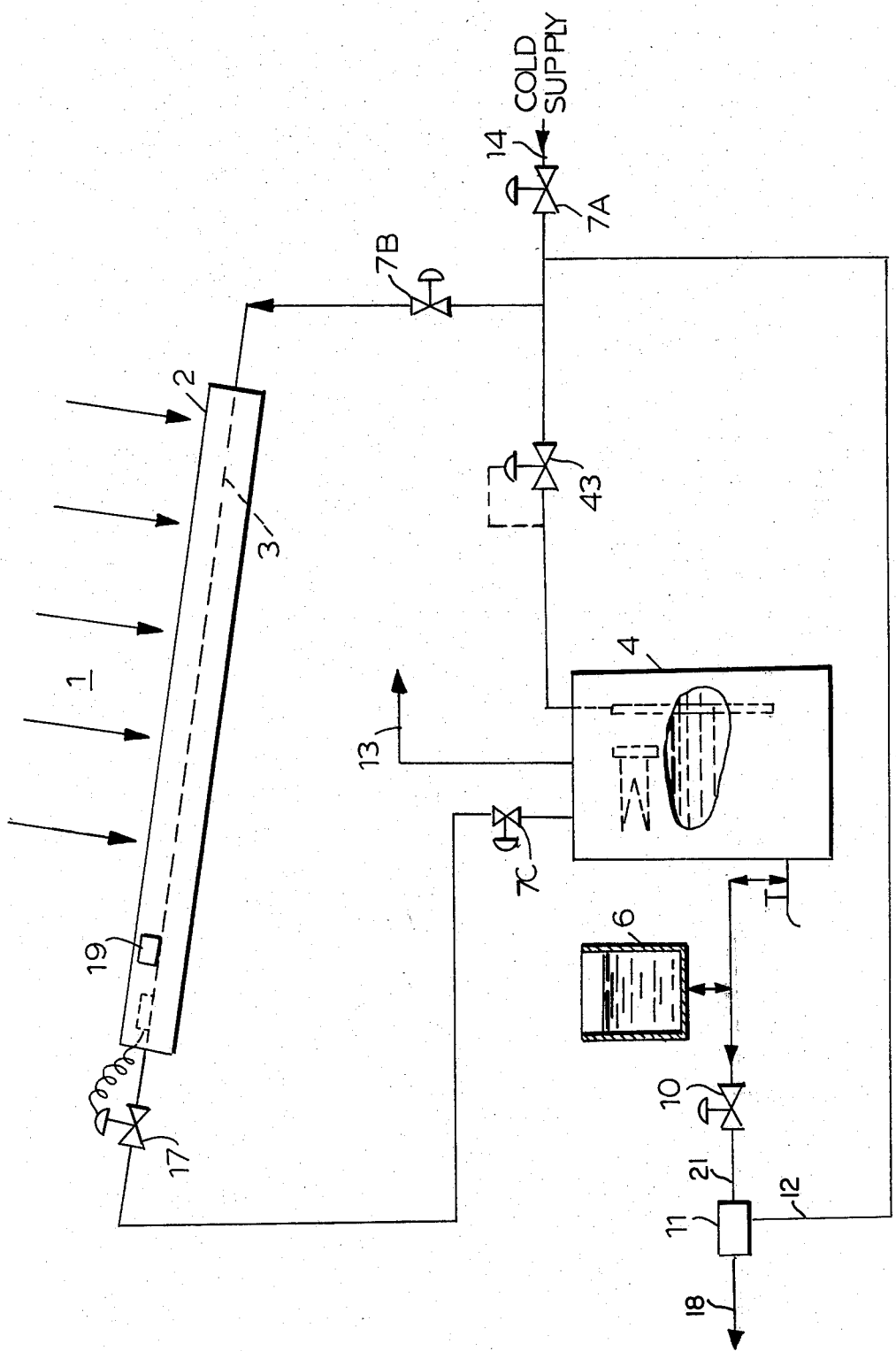
FIG. 1 is a schematic diagram of my invention.

Referring now to the drawings and more particularly to FIG. 1 the solar water heating system comprises a solar collector 2, exposed to solar radiation 1, a temperature control valve 17, a conventional hot water heater 4, an accumulator 6, a pressure reducing valve 43, and a pressure relief device 11.

As shown in FIGS. 2 and 4 the solar collector includes a collector plate 33 supported and attached to a structure such as the roof of a building, by threaded rods 40, projecting from the under side of the assembly. A light weight back enclosure 38, is spaced from the collector plate by tubular spacers 41, and the intervening space contains thermal insulation 37. The plate 33, insulation 37 and back enclosure 38, are covered by a single piece, molded transparency 35, whose sides and ends 39 are turned down to form a weather-tight inverted, pan-like part. The molded transparency 35, may be partially supported and spaced from the plate 33, by edge insulation 36, but it is also attached to the back enclosure 38 by suitable fasteners 44, which engage the sides 39 of transparency 35 and a smaller "L" shaped flange integral with the back enclosure 38.

In operation the water heating system performs as follows.

Solar energy 1, penetrates the transparent cover 35, of the collector assembly 2, and is absorbed by plate 33 through which the water to be heated flows through passages 34. The system is not limited to the use of this specific design of collector but rather may embody other collector configurations well known to the art.

It will be noted that the water entering the collector is taken from line 14, between service valve 7A and pressure reducing valve 43, which may be one of a number of designs known to the art. Line 14 is the cold water supply to the system and the pressure in this line is typically of the order of 50 to 60 pounds per square inch (psi) gauge (above atmospheric pressure). Additional service valves 7B and 7C in the lines to and from the collector, like service valve 7A in supply line 14, are wide open during normal operation and impose no significant pressure drop due to the flow. Their only purpose is to isolate the entire system or the collector in the event that service operations are required.

When no hot water is being drawn from the system through line 13, pressure reducing valve 43 is in its closed position because it is adjusted to open only if the pressure in the water heater tank 4 drops to a value well below the supply pressure in line 14. Typically if the supply pressure is 50 to 60 psi, pressure reducing valve 43 would be set to open if the pressure in the hot water system should drop to 35 to 40 psi.

With reducing valve 43 in its closed position, the pressure in the hot water system is controlled by pressure relief device 11. If the cold water supply pressure in line 14 is stable, a spring loaded relief valve, known to the art, or a gravity relief valve, similar to that commonly found on domestic pressure cookers, may be used as relief device 11. The preferred relief device shown in FIG. 3 will hold the pressure in the hot water system at a regulated valve slightly below the cold water supply pressure in line 14 even though this pressure may change from time to time. The pressure relief device 11, comprises a housing 22, moveable piston 23, spring 26, valve spindle 27 attached to or integral with piston 23, adjustable valve seat 28, and water discharge hose 18.

Referring to FIGS. 1 and 3 it is seen that the supply water pressure is communicated to the top of piston 23 by line 12 while the relief pressure in line 21 is below the piston 23. However, the force of the relief pressure, which is brought to the relief valve 11 from the bottom of the hot water tank through line 21, is assisted by compression spring 26. The pressure in the hot water system will therefore be regulated at a value slightly below the cold water supply pressure in line 14, typically 3 to 5 psi lower. Flow will, therefore, occur through collector 2 into the hot water heater tank impeded only by valve 10 (to be discussed below). This flow will compress the entrapped air in accumulator 6 and the pressure in the hot water system will tend to rise, approaching the cold water supply pressure. The increasing pressure will push on the lower surface of piston 23, open the space between valve spindle 27 and seat 28 and relieve as much water from the bottom of the water heater tank 4 through line 21 as enters the top of the tank from the collector through service valve 7C.

As described, the relief device 11 will at all times maintain a pressure in the hot water system that is lower than the cold water supply pressure in line 14 as long as pressure reducing valve 43 is closed and electrically actuated valve 10 is open. The existence of this pressure difference removes any restriction in the relative elevation of the hot water heater 4 and collector 2. No pump or thermo-syphon effect is necessary to produce water flow through the collector even though it may be on the roof of the building and the hot water storage tank or water heater 4 is at a lower level.

Under the conditions just described, with electric valve 10 open, the rate of flow of water through collector 2 will be controlled by the opening and closing of valve 17 located in the line between collector 2 and storage tank 4. Valve 17 may be any type of thermally controlled valve of which many designs are known to the art. The thermostatic valve used in automotive cooling systems, known commonly as the "thermostat," is one common type. It is "direct acting" which in control terminology means that when the temperature of the water around the valve's sensing element rises above a certain "set point," the valve gradually opens. If the flow rate through the collector 12 then tends to exceed that which can be heated by the solar energy from the cold water supply temperature to the "set point" of thermal valve 17, the outlet temperature sensed by the thermal element of valve 17 will reduce and the valve will adjust to a more closed position. It is evident that this type of control action will adjust the flow rate in such a way as to maintain a relatively constant water temperature, leaving collector 2 through valve 17 and continuing to storage tank 4. For domestic hot water systems this temperature would be of the order of 130 to 160 degrees F.

A preferred form of direct acting thermal valve 17 has a temperature sensing bulb 16 connected to the valve operating system by means of a small bore "capillary" tube. This enables bulb 16 to be brought into thermal contact with plate 3 near the water outlet from collector 2 while the valve itself is located in the line as shown in FIG. 1. This type of thermal valve 17, well known to the art, also has an adjusting screw which enables adjustment of the valve's set point, and hence the leaving water temperature from plate 3 to any desired value within the valve's specified range.

When pressure reducing valve 43 is closed and valve 10 is open, the solar collector will heat cold service water entering through line 14 and deliver the hot water to the top of storage tank 4 through service valve 7C, even though no hot water is being withdrawn from the system through line 13 for dish washing, clothes washing and other common requirements. An essentially equal amount of cold water will be displaced from the bottom of the tank and will leave through line 18. This wasted water can be used for irrigating shrubbery or grass. However, if the waste of 50 to 60 gallons of water per day is undesirable, this wasted water can be collected in some elevated cistern in the building and used for flushing toilets or other purposes.

The accumulator 6 serves two functions, one of which tends to reduce the water wasted through line 18 by relief device 11. If a hot water demand of limited quantity, such as might result from opening a lavatory or sink hot water faucet, should occur, the pressure in the hot water system will drop. If the drop exceeds the regulation of relief device 11, it will close. At the same time the compressed air trapped in accumulator 6 will expand and a portion of the hot water withdrawn through line 13 will be made up by water flowing from accumulator 6 to the bottom of tank 4 through line 45. Following such a limited draw of hot water, the generation of new hot water by the solar collector will restore the higher controlled pressure level of the hot water system and accumulator 6 will be recharged with cold water from the bottom of tank 4 before water begins to be relieved by relief device 11. It will be clear to one skilled in the art that the larger the volume of accumulator tank 6, the less water will be wasted through relief device 11.

A second function of accumulator 6 is to prevent a large and rapid drop of pressure in the hot water system when the usual small demands of opening hot water faucets occur. Such an abrupt pressure drop causes an increase in the flow of cold water through thermal valve 17 and a temporary loss of control of the hot water temperature leaving the collector. Accumulator 6 reduces this disturbance and provides more time for thermal valve 17 to assume a more closed position.

The function of pressure reducing valve 43 is to provide cold water make-up to the hot water system when larger draws occur than can be made-up by accumulator 6. Such draws might be associated with operation of clothes washers which require more than 10 gallons. Under such conditions the pressure in the hot water system will fall to the setting of reducing valve 43. It will open and supply cold water to the bottom of the tank 4 through conventional "dip tube" 8 which is common to domestic water heaters. Component 4 is illustrated as a conventional electric hot water heater embodying resistance heating element 5. In such a configuration, if the solar energy absorbed by collector 2 is insufficient to maintain the temperature in tank 4 above the setting of the conventional thermostatic control associated with element 5, it will be energized electrically in the manner well known to the electric water heater art. This will insure a continuous supply of hot water. It will be obvious to those skilled in the art that tank 4 could be any of several types of fuel energized water heaters or simply an insulated storage tank. In the latter event the quantity of hot water available would be limited to that produced by solar collector 2. Electric valve 10 is not specifically required as a functional part of the system heretofore described. It has been found, however, to be desirable to prevent the waste of relatively small quantities of water during the night and at other times when solar energy is not available. It has been found that thermal valves 17 and pressure regulating valves 43 occasionally do not close "drip tight" due perhaps to small dirt particles or imperfections in their valve seats. If either of these valves do leak slightly when functionally they should be closed, this leakage can maintain the pressure in the hot water system slightly above the setting of relief device 11 and the water will be wasted. The relief device itself may also leak slightly due to dirt contamination or seat imperfection.

Electric valve 10 serves as a safety control to minimize water wastage as described above. Two methods of operating valve 10 are made a part of this disclosure. In its preferred form valve 10 is "normally closed" meaning that electrical energy must be applied to open it. The application of this electrical energy can be switched in two ways well known to those experienced in the controls art. First, an event timer 20 may be used as part of the system. It would be programmed to energize valve 10 only during daylight hours when solar energy could be available. A second, preferred means of switching electrical energy to valve 10 is represented by thermostat 19 which senses the temperature of solar collector plate 3. Its setting and differential can be related to the setting of thermal valve 17 so that electric valve 10 is only energized and opened during periods when the collector is hot enough to supply useful quantities of hot water to the system. It will be obvious to those skilled in the art that this electrical switching function can be embodied in the design of thermal valve 17 making the addition of thermostat 19 unnecessary.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. A passive solar water heating system with an output and an input, said input connectable to a pressurized water supply comprising:

pressurized cold water system input at a first pressure;

a solar collector having an output end and having an input end, said input end of said solar collector connected to said system input;

said input end of said solar collector connectable to said pressurized water supply;

a hot water storage tank positioned below the elevation of said solar collector;

said storage tank having a normally hot first input at the top, a normally cold second input at the bottom, and a normally hot first output at the top, and a normally cold second output at the bottom;

a temperature control valve means interconnected between said output of said solar collector and said first input of said storage tank, said temperature control valve means for sensing the temperature adjacent said output end of said solar collector to allow only hot water to then enter said storage tank through said first input of storage tank;

said second input of said storage tank connected to said collector and said pressurized water system input;

a pressure reducing valve means interconnected between said second input of said storage tank and said system pressurized water input for supplying water to maintain pressure in said storage tank when water pressure in said storage tank drops below a certain second pressure lower than said first pressure;

said first output of said storage tank connected to at least one hot water valve means for supplying hot water; and a pressure relief means having a first input and second input and an output, said first input of said pressure relief means connected to said second output of said storage tank output, said second input of said pressure relief means connected to said pressurized water system input, said pressure relief means for relieving cold water from the bottom of said storage tank through said cold second output at a rate equal to the flow from said solar collector output and into said normally hot first input to said storage tank;

said pressure relief means for regulating pressure in said storage tank when said pressure reducing valve means and said hot water valve means are closed, said pressure relief means for regulating a third pressure slightly below that of said first pressure of said pressurized water input to insure water flow through said collector whenever said temperature control valve is open, said third pressure is greater than said second pressure.

2. A passive solar water heating system as set forth in claim 1, further comprising:

an accumulator tank means having an input/output tube interconnected between said second output of said storage tank, and said pressure relief means first input;

said accumulator tank means for reducing water flow from said second output of said storage tank and for stabilizing water pressure in said storage tank under small water demands through said first output of said water tank.

3. A passive solar water heating system as set forth in claim 1 or 2 further comprising:

a safety control valve means positioned adjacent said first inlet of said pressure relief means for further minimizing water discharge from said storage tank third output; and electric control means for regulating the opening and closing of said safety control valve means.

4. A passive solar water heating system as set forth in claim 3 wherein:

said electric control means is an event timer preprogrammable to open and close said safety control valve means regularly on a daily basis.

5. A passive solar water heating system as set forth in claim 3 wherein:

said electric control means is a thermostat means for sensing the metal plate or water temperature at the output end of said collector;

said thermostat means for opening said safety control valve means only during periods when the metal plate or water in said collector is above a certain temperature.

* * * * *